United States Patent [19]

Burckhardt

[11] Patent Number: 4,626,042
[45] Date of Patent: Dec. 2, 1986

[54] ANTI-LOCKING SYSTEM FOR A TWO-WHEEL ROAD VEHICLE WITH HYDRAULIC DUAL CIRCUIT BRAKING INSTALLATION

[75] Inventor: Manfred Burckhardt, Waiblingen, Fed. Rep. of Germany

[73] Assignee: Daimler-Benz Aktiengesellschaft, Stuttgart, Fed. Rep. of Germany

[21] Appl. No.: 574,083

[22] Filed: Jan. 26, 1984

[30] Foreign Application Priority Data

Jan. 27, 1983 [DE] Fed. Rep. of Germany ....... 3302642

[51] Int. Cl.$^4$ .............................................. B60T 8/02
[52] U.S. Cl. .................................. 303/106; 303/6 A; 303/6 C; 303/96
[58] Field of Search .................... 303/95, 96, 97, 98, 303/99, 105, 106, 107, 108, 109, 110, 111, 119, 6 A, 6 C; 188/181 A, 181 C; 364/426; 383/DIG. 4

[56] References Cited

U.S. PATENT DOCUMENTS

| | | | |
|---|---|---|---|
| 3,467,444 | 9/1969 | Leiber | 303/105 |
| 3,630,579 | 12/1971 | Rodi | 188/181 A |
| 3,948,568 | 4/1976 | Leiber | 303/119 |
| 3,980,344 | 9/1976 | Burckhardt | 303/119 |
| 4,465,322 | 8/1984 | Hayashi | 303/6 A |
| 4,485,445 | 11/1984 | Braschel | 303/95 |

FOREIGN PATENT DOCUMENTS

| | | |
|---|---|---|
| 0062246 | 10/1982 | European Pat. Off. ...... 303/DIG. 4 |
| 1935596 | 2/1971 | Fed. Rep. of Germany . |
| 2031283 | 12/1971 | Fed. Rep. of Germany . |
| 2849948 | 5/1980 | Fed. Rep. of Germany . |
| 3048948 | 7/1982 | Fed. Rep. of Germany . |

OTHER PUBLICATIONS

Maierbacher, "Zwei auf einen Tritt", *Motorrad*, 3-4-1981, pp. 119-122.
Leiber et al., "Autiblockiensystem fur Personenwagen mit digitaler Elektronik–Aufbau und Funktion", Autorobitechnische Zeitschrift, 81 (1979), pp. 569-571, 577, 578, 583.

*Primary Examiner*—Bruce H. Stoner, Jr.
*Assistant Examiner*—Alvin Oberley
*Attorney, Agent, or Firm*—Barnes & Thornburg

[57] ABSTRACT

An anti-locking system is provided for a two-wheel road vehicle which is equipped with electro-hydraulic braking pressure control equipment, which generates the driving signals necessary for appropriate driving or braking pressure control valves by processing wheel rotational speed sensor output signals. In order to obtain both good braking effect and good driving stability when the control equipment responds, the brake slip $\lambda_F$ of the front wheel is controlled to a value which is always less than the rear wheel brake slip $\lambda_R$. The control responds if, on the one hand, critical values of the wheel deceleration are exceeded and/or, on the other hand, if the brake slip $\lambda_F$ on the front wheel exceeds a threshold value still considered as permissible. As part of the anti-locking system, the braking installation is so designed that for both manual actuation and pedal actuation both wheel brake circuits respond with the installed braking force distribution. This is so arranged that for adhesion coefficients of more than 0.3 between the track and the wheel, the rear wheel would lock before the front wheel should the control equipment not operate.

9 Claims, 2 Drawing Figures

ANTI-LOCKING SYSTEM FOR A TWO-WHEEL ROAD VEHICLE WITH HYDRAULIC DUAL CIRCUIT BRAKING INSTALLATION

FIELD OF THE INVENTION

The invention concerns an anti-locking system for a two-wheel road vehicle with hydraulic dual circuit braking installation, having a wheel rotational speed sensor individually provided for each vehicle wheel and braking pressure control equipment including braking pressure control valves, which equipment, when a threshold value of the wheel deceleration considered as critical is exceeded, produces, by driving the appropriate braking pressure control valve, a braking pressure reduction in the wheel brake of the wheel tending to lock, two actuating elements, for example, a pedal and a hand brake lever, by actuation of which at least one of the two wheel braking circuits can be activated, being provided for actuating the braking installation.

DESCRIPTION OF THE RELATED ART

Anti-locking systems for two-wheel vehicles have previously been exclusively realized as individual wheel controls, in which the dynamic behavior of the vehicle wheels during braking is acquired by means of mechanical deceleration sensors, for example, with the help of flywheel masses rotating with the vehicle wheels, which, if a threshold value of the wheel deceleration considered as critical occurs at the wheel under consideration, rotate further against the return force of a spring and by this means trigger the driving of a braking pressure control valve in the direction of a reduction of the braking pressure.

An individual wheel control of this type, which could also be designed on the model of electro-hydraulic anti-locking control equipment known in association with four-wheel vehicles, does provide an effective protection against locking in the case of braking operations carried out during travel in a straight line, without having a significant adverse effect on the travelling stability of a motorcycle or bicycle. In the case of a curved-path braking operation, however, in which drastically different side force coefficients can arise, depending on the amount of the "lean in" set at the front wheel and as a function of the brake slip, it is possible, in curved-path situations which are not too rare, if the braking pressure control takes place exclusively as a function of the wheel deceleration, for the lateral guidance force of the front wheel to be less than that of the rear wheel and, because of this, for a driving situation to arise which can no longer be controlled by the driver and is characterized by an excessive understeer tendency of the motorcycle or bicycle.

SUMMARY OF THE INVENTION

The object of the invention is therefore to provide an anti-locking system of the type mentioned at the beginning which will also operate reliably in curved-path braking situations in the direction of maintaining the travelling stability.

This object is achieved by a control equipment designed so that the brake slip ($\lambda_F$) of the front wheel, referred to a reference velocity ($v_r$), occurring during a braking operation is always less than the brake slip ($\lambda_R$), referred to the same reference velocity, occurring at the rear wheel.

According to this, in the case of a manually controlled or pedal-controlled actuation of the braking installation, both the front wheel brake and the rear wheel brake are always activated with the installed braking force distribution prescribed by the design of the braking installation and the braking pressure control will also ensure that the brake slip $\lambda_F$ of the front wheel is always less than the brake slip $\lambda_R$ occurring at the rear wheel.

This achieves the result that, irrespective of whether a straight-line or a curved-path braking situation exists, there is always available at the front wheel of the bicycle a "lateral guide force reserve" adequate for the travelling stability and safe controllability of the bicycle.

Another object of the invention is the provision of an anti-locking system for a two-wheel road vehicle wherein the brake slip $\lambda_F$ of the front wheel is controlled to a value which is less than a fixedly prescribed amount D than the brake slip $\lambda_R$ at the rear wheel.

It is another object of the invention to provide an anti-locking system for a two-wheel road vehicle wherein a prescribed value D by which the brake slip $\lambda_F$ of the front wheel is to be less than that of the rear wheel is at least 3% and preferably 5% plus or minus 1% in magnitude.

It is another object of the invention to provide an anti-locking system for a two-wheel road vehicle wherein the anti-locking control is activated if the brake slip $\lambda_F$ occurring at the front wheel is greater than a prescribed limiting value L, and at which the anti-locking control corresponds to a value at which the maximum force transmission between track and wheel exists (maximum of the $\mu$-slip curve) achieving effect wherein even in the case of gently braking, that is, if the vehicle wheels only slowly acquire an increased brake slip and critical wheel deceleration values are therefore not exceeded, the anti-locking control responds in good time.

It is another object of the invention to provide an anti-locking system for a two-wheel road vehicle wherein the control equipment produces a drive of its regulating element in the direction of the braking pressure maintaining the function when a first threshold value $\lambda_{F1}$ of the front wheel brake slip $\lambda_F$ is exceeded and produces a drive of its regulating element in the direction of a braking pressure reduction function when a second threshold value $\lambda_{F2}$ is exceeded, such that in gentle braking, the anti-locking control responds in good time.

It is another object of the invention to provide an anti-locking system for a two-wheel road vehicle wherein the installed braking force distribution of the braking installation is so designed that at braking values which are larger than a prescribed limiting braking value $Z_S$, which is markedly less than a maximum braking value $Z_{max}$ obtainable with high adhesion coefficients between the track and the vehicle wheels, the usable braking force at the rear wheel is greater than the usable braking force at the front wheel, the braking installation which forms an important functional component of the anti-locking system according to the invention has the effect that, in the great majority of traveling and braking situations in which the anti-locking control has not yet responded, the relation between the front wheel brake slip $\lambda_F$ and the rear wheel brake slip $\lambda_R$, in accordance with the relationship $\lambda_F < \lambda_R$ is favorable for traveling stability.

It is another object of the invention to provide an anti-locking system for a two-wheel road vehicle wherein the limiting braking value $Z_S$ for a braking value corresponds to a braking effort which attainable at adhesion coefficients $\mu$ of $0.3\pm 0.05$, the relation between the front wheel brake slip $\lambda_F$ and the rear wheel brake slip $\lambda_R$, in accordance with the relationship $\lambda_F < \lambda_R$ being favorable for traveling stability.

It is another object of the invention to provide an anti-locking system for a two-wheel road vehicle comprising at least a tandem main cylinder with one output pressure space allocated to the front wheel brake circuit and one output pressure space allocated to the rear wheel brake circuit such that the main piston of the tandem main cylinder can be displaced both by the actuation of a pedal and by the actuation of a hand lever in the direction of a pressure increase in the two brake circuits and wherein the output pressure space limited in axial direction by the main piston and the floating secondary piston of the tandem main cylinder, is allocated to the rear wheel brake circuit and the output pressure space limited by the floating secondary piston and the end wall of the cylinder housing is allocated to the front wheel brake circuit.

It is another object of the invention to provide an anti-locking system for a two-wheel road vehicle wherein a main piston of a tandem main cylidner is designed as a floating piston on which can be supported a pressure rod displaceable by means of a brake pedal and the main piston limits, on one side, a control pressure space of the tandem main cylinder, which can be subjected to the outward pressure of a control cylinder actuatable by a hand lever.

It is a further object of the invention to provide an anti-locking system for a two-wheel road vehicle wherein an electro-hydraulic control equipment operating on a feedback principal is provided as the braking pressure control equipment and includes braking pressure control valves allocated to each of the wheel brake circuits, the basic position of which braking pressure control valves is the pressure-increasing position, these brake pressure control valves being drivable by electrical output control signals of an electronic control unit into a pressure maintaining and a pressure reduction position, the latter electronic control unit generating the control signals necessary for the efficacious driving of the braking pressure control valve by processing output signals, characteristic for the wheel rotational speeds or the peripheral velocities of the vehicle wheels, from electronic wheel rotational speed sensors to provide, in a simple manner, appropriately (in the sense of the concept of the invention) employing components of an anti-locking system known in association with four-wheel vehicles.

It is a further object of the invention to provide an anti-locking system for a two-wheel road vehicle which is economical of construction and maintenance and which solves difficulties obtaining with prior art devices.

BRIEF DESCRIPTION OF THE DRAWINGS

The foregoing and other objects, features, and advantages of the present invention will become more apparent from the following description when taken in connection with the accompanying drawings which show, for the purposes of illustration only, one embodiment in accordance with the present invention, and wherein.

DESCRIPTION OF THE PREFERRED EMBODIMENTS

Figure 1:
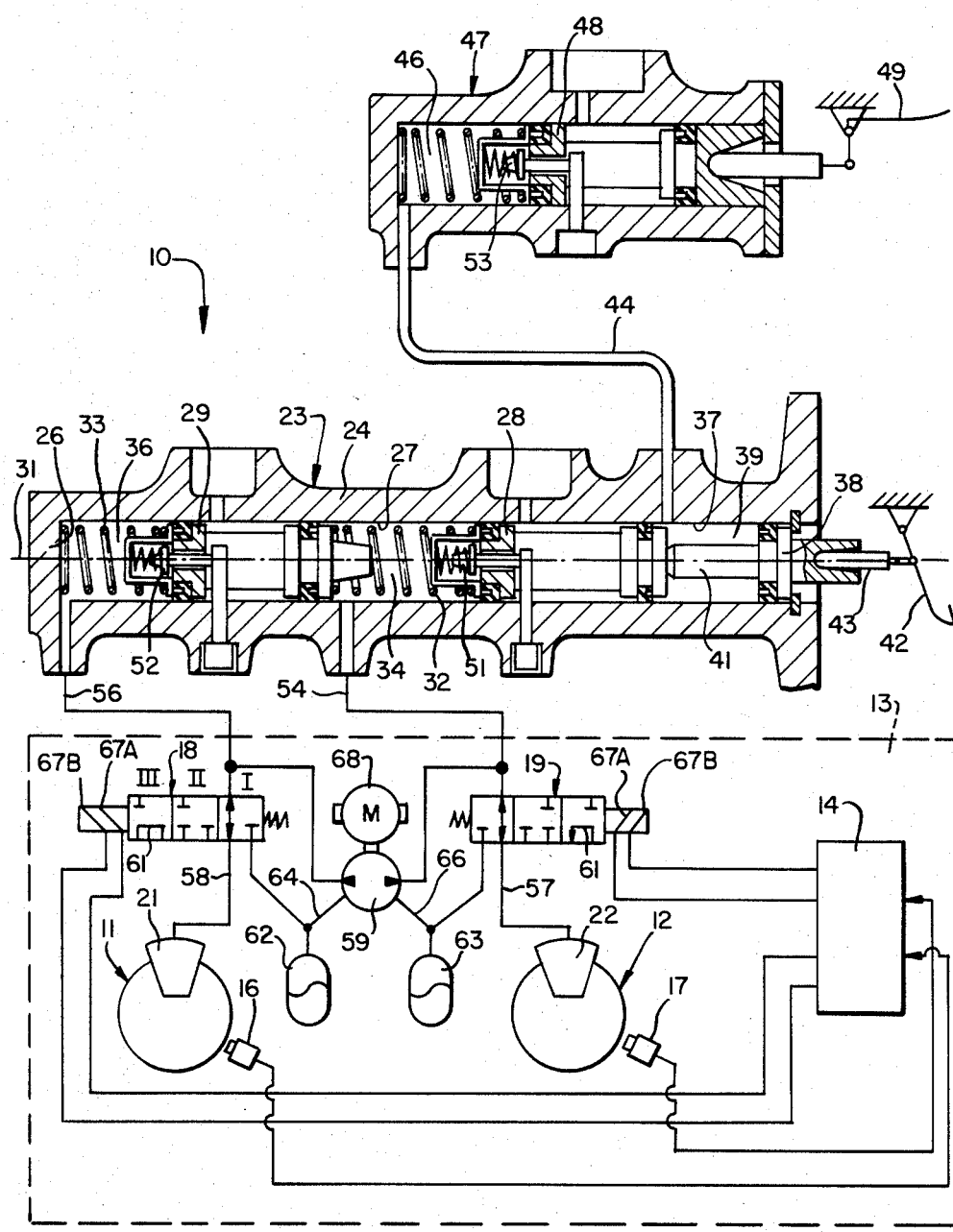
FIG. 1 shows an embodiment example of an anti-locking system, according to the invention, for two-wheel vehicles with a braking installation whose wheel brakes can always be actuated together to produce an installed braking force distribution by alternative or common pedal and manual actuation, having electro-hydraulic braking pressure control equipment

Referring now to the drawings wherein like reference numerals represent like structural elements, and specifically with reference to the anti-locking system for a two-wheel road vehicle—motorcycle or moped of a specific design shown in FIG. 1, and which is indicated overall by 10, includes a hydraulic dual circuit braking installation, of which the front wheel brake 11 and the rear wheel brake 12, each shown as a disc brake, can be activated together by both manually controlled and pedal-controlled actuation to produce an installed braking force distribution, and, in combination with this, electro-hydraulic braking pressure control equipment, indicated overall by 13, whose characteristic function consists in keeping the brake slip occurring at the braked wheels during a braking procedure below a threshold value consistent with a good braking effect, always controlling the brake slip occurring at the front wheel to a value which is lower than the brake slip occurring at the rear wheel—which is braked at the same time—and also providing braking pressure control in the direction of avoiding locking of the vehicle wheels even when threshold values of the wheel peripheral deceleration considered as unpermissible are attained or exceeded.

In order to facilitate from the beginning the fulfillment of the condition that a brake slip $\lambda_F$ occurring at the front wheel should be less than a brake slip $\lambda_R$ occurring at the rear wheel, the setting of the installed braking force distribution of the braking installation is so designed that, without control and assuming the same adhesion coefficients at both vehicle wheels, during a progressive increase in the braking force at both vehicle wheels, the rear wheel would be the first to attain to a high wheel slip and tend to lock.

The designs of the braking pressure control equipment 13 and the braking installation 11, 12 described above are selected, based on the knowledge that a motorcycle, for example, still remains perfectly controllable if its front wheel has approximately 5-10% less brake slip than its rear wheel in order to attain the highest possible travelling stability, that is, to keep the motor cycle controllable the great majority of the travelling and braking situations with a substantial probability of occurrence, which is only possible if, as is attempted and attained by the designs, the lateral guidance force of the front wheel is always greater than that of the rear wheel.

In order to obtain overall as good a braking effect as possible, the braking pressure control equipment 13 is so designed in respect of the braking pressure control at the rear wheel brake 12 that, with heavy braking at the rear wheel, approximately the maximum of the transmission capability of the tire, viewed in the peripheral direction of the wheel, is attained, the braking pressure control at the front wheel brake 11 in the previously described sense being, as it were, "coupled" to the braking pressure control at the rear wheel via the slip ratio $\lambda_F/\lambda_R < 1$ or according to a condition:

$$\lambda_F \leq \lambda_R - D$$

where D is a prescribed or prescribable slip difference by which the brake slip $\lambda_F$ of the front wheel is always to be less than the brake slip $\lambda_R$ at the rear wheel.

The brake slip values $\lambda_F$ and $\lambda_R$, which are allowed for in the control, are determined by means of an electronic control unit 14 provided as part of the braking pressure control equipment 13, which control unit 14, by processing output signals proportional to the wheel rotational speeds from the wheel rotational speed sensors 16 and 17 individually allocated to the vehicle wheels, generates output signals in the appropriate order and combination required for driving braking pressure control valves 18 and 19, by means of which the braking pressure corresponding to the control objective is controllable in the brake calipers 21 and 22 of the wheel brakes 11 and 12, respectively. The brake slip values $\lambda_F$ and $\lambda_R$ taken into account for the front wheel and the rear wheel are determined relative to a reference speed $v_R$, which may correspond at the beginning of a braking procedure to, for example, the greater of the two wheel peripheral velocities acquired by means of the wheel rotational speed sensor output signals and which is subsequently reduced, for example by means of a variation with time corresponding approximately to that which would result if braking was carried out at the highest possible adhesion coefficient between the track and the vehicle wheels with the maximum transmissible wheel peripheral forces.

FIG. 1 shows an anti-locking system 10, according to the invention, and its electro-hydraulic control equipment 13.

In order to apply braking pressure jointly to the wheel brakes 11 and 12, a tandem main cylinder 23 is provided, in whose cylinder bore 27 passing through the cylinder housing 24 in the axial direction, and in the figure limited on the left hand side by the end wall 26, a main piston 28 and a secondary piston 29 designed as a floating piston are located so as to be displaceable backwards and forwards in the direction of the longitudinal axis 31 of the cylinder housing 24. The main piston 28 and the secondary piston 29 are supported in a conventional manner, by means of a first compression spring 32 and a second compression spring 33, against one another and against the end wall 26 of the cylinder housing 24 respectively. A first output pressure space 34 is limited in the axial direction by the main piston 28 on the one hand and the secondary piston 29 on the other hand, this output pressure space 34 being allocated to the rear wheel braking circuit 12; the second output pressure space 36, limited in the axial direction by the end wall 26 and the secondary piston 29, is allocated to the front wheel braking circuit 11.

The primary piston 28, on the one hand, and a control piston 38 located in the right-hand end section 37 of the cylinder bore 27, on the other hand, which control piston 38 tightly seals the end section 37 of the cylinder bore 24 against the exterior, limit in the axial direction a control pressure space 39, the subjection of which to pressure can displace the main piston 28, itself designed as a floating piston, in the direction of a braking pressure increase in the output pressure spaces 34 and 36, the main piston 28 lifting away from a rod 41 connected to the control piston 38, by means of which rod 41 the main piston can also be displaced by operation of a brake pedal 42, which engages with the control piston 38 via a push rod 43, in the direction of an increase in braking pressure.

The control pressure space 39 of the tandem main cylinder 23 is connected, via a control pressure line 44, to the output pressure space 46 of a control cylinder 47 designed in the form of a single circuit main braking cylinder, the piston 48 of which control cylinder 47 is displaceable by operation of a hand lever 49 in the direction of a pressure increase in the output pressure space 46 and the control pressure space 39. The main piston 28 and the secondary piston 29 of the tandem main cylinder 23 and the piston 48 of the control cylinder 47 are provided with spring loaded central valves 51 and 52, or 53 of a structure and function known per se, which, in the basic position of the individual pistons 28, 29, 38 and 48 shown, which these adopt if the braking installation is not actuated are held open by end stop effect. The output pressure spaces 34, 36 and 46 of the tandem main cylinder 23 and the control cylinder 47 and, via the line 44, also the control pressure space 39 of the tandem main cylinder 23 being connected with reservoirs, which are not shown.

The design described so far of the operating elements provided for pedal controlled and/or manually controlled activation of the wheel brakes 11 and 12 has the effect that in the event of a braking operation, the wheel brakes 11 and 12 are always activated jointly, with the installed braking force distribution, and, in the specific embodiment example shown, according to a fixed braking force distribution decided in advance; this is so designed, by way of being a best possible compromise between attainable vehicle deceleration and traveling stability, that at adhesion ($\mu$) coefficients amounting to more than 0.3 between the track and the vehicle wheels during a sharp braking operation—without anti-locking control—the rear wheel would be the first to attain a high brake slip or to lock.

The electro-hydraulic control equipment 13 of the anti-locking system 10 shown in the lower part of FIG. 1 operates on the feedback principle, whereby, in braking pressure reduction control phases for the purpose of preventing locking of the currently braked wheel, brake fluid from the wheel brake caliper or calipers is pumped back into the appropriate output pressure space 34 and/or 36 of the tandem main cylinder 23.

The braking pressure control valves 18 and 19 provides for each of the braking circuits 11 and 12 respectively are designed, in the embodiment example shown, as 3/3-way magnetic valves, in whose basic positions indicated by I the pressure outputs 54 and 56 of the output pressure spaces 34 and 36, respectively, of the tandem main cylinder 23 are connected to the brake lines 57 and 58, respectively, which feed to the brake calipers 22 and 21 of the rear wheel brake 22 and the front wheel brake 21, respectively; the brake lines 57 and 58, however, are shut off against a dual circuit return pump 59.

By excitation of a control winding 67A of these braking pressure control valves 18 and 19 by means of a pressure maintaining control signal from the electronic control unit 14, the braking pressure valves 18 and/or 19 can be driven individually or jointly into a shut-off position indicated by II, in which position the brake calipers 21 and/or 22 of the front wheel and rear wheel braking circuits 11 and 12, respectively, are shut off against the associated pressure outputs 56 and 54, respectively, of the tandem main cylinder 23 and, in consequence, braking pressure can neither be increased nor reduced in the wheel brake calipers 21 and 22, and therefore, the momentarily prevailing braking pressure is maintained.

The braking pressure control valves 18 and 19 can be individually driven into a return position indicated by III by being driven by means of a pressure reduction control signal from the electronic control unit 14 to each of them, in which return position the respective associated output pressure space 36 or 34 of the tandem main cylinder 23 is shut off from the braking line 58 and 57 of the appropriate wheel braking circuit 11 and 12, respectively, the latter, however, being connected via a return path 61 of the braking pressure control valve 18 or 19 to an intermediate store 62 or 63 and to the inlet 64 or 66 of the appropriate return pump circuit, via which brake fluid from the wheel brake 11 or 12 can be returned into the associated output pressure space 36 or 34 of the tandem main cylinder 23.

In the specific embodiment example shown, in accordance with FIG. 1, the braking pressure control valves 18 and 19 have two control windings 67A and 67B, of which one, 67A, can be excited by a pressure maintaining control signal from the electronic control unit 14 and of which the second, 67B, can be excited by a pressure reduction control signal from the electronic control unit 14, the pressure reduction position III being adopted only if both the pressure retention control signal and the pressure reduction control signal are present. It is, however, obvious that braking pressure control valves 18 and 19 with appropriate function can also have only one single control winding, by whose alternative excitation using a pressure maintaining signal, for example a 3A signal, or a pressure reduction signal, for example a 6A signal, the pressure maintaining position II or the pressure reduction position III, respectively, is adopted, the braking pressure control valves 18 and 19 being forced into their basic position under the influence of a return spring if none of these control signals is present.

The return pump 59 is designed as a free piston pump driven by an electric motor 68, which free piston pump does not itself exert a suction effect. The return pump 59 is activated if and so long as one of the pressure maintaining or pressure reduction control signals from the electronic control unit 14 is present. Appropriate activation of the return pump 59 can, therefore, be attained from an OR connection of the pressure maintaining and pressure reduction control signals from the electronic control unit 14.

The electro-hydraulic control equipment shown in the lower part of FIG. 1 is, in respect of the type of its hydraulic regulating elements, the braking pressure control valves 18 and 19 and free piston return pump 59, and in respect of the production of the output signals proportional to the wheel rotational speed, from processing of which output signals in the electronic control unit 14 the appropriate control signals for the braking pressure control valves 18 and 19 are obtained, similar to an anti-locking system generally known for four-wheel vehicles but differs from the latter basically due to the control algorithm. Whereas an anti-locking system for a four-wheel vehicle should be so designed that the rear wheel brake slip is less than the front wheel brake slip, the position is precisely reversed in the case of the anti-locking system 10, according to the invention, for a motorcycle.

Figure 2:
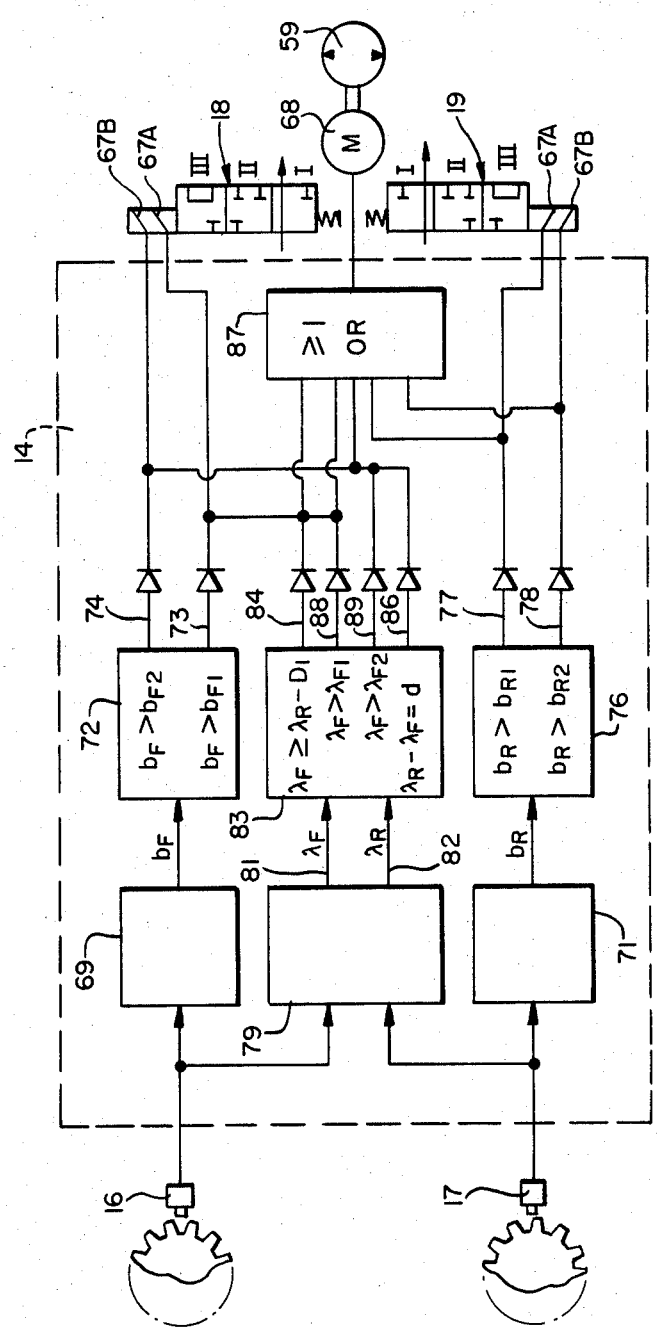
FIG. 2 shows details of an electronic control unit provided as part of the electro-hydraulic control equipment in accordance with FIG. 1.

A possible design of a suitable electronic control unit 14, as part of the anti-locking system 10 according to the invention, for producing the necessary drive signals for the braking pressure control valves 18 and 19 is shown in FIG. 2. In this figure the wheel rotational speed sensors 16 and 17 are assumed to be inductive generators of known design whose output signals are series of voltage pulses, whose pulse series frequency is proportional to the rotational speed of the monitored vehicle wheel. The output signals of the two wheel rotational speed sensors 16 and 17 are each supplied to a differentiation stage 69 or 71, respectively, whose output signals are voltage signals proportional to the wheel decelerations or accelerations. The output signals from the differentiation stage 69 which is characteristic of the wheel deceleration $b_F$ of the front wheel is supplied to a comparator stage 72, which sends out a high level output signal at a first output 73 if the wheel deceleration $b_F$ exceeds a first threshold value $b_{F1}$. The braking pressure control valve 18 allocated to the front wheel braking circuit is driven into its pressure maintaining position II by this output signal.

The comparator stage 72 transmits an output signal at a second output 74 if the wheel deceleration $b_F$ reaches or exceeds a threshold value $b_{F2}$, which is greater than the threshold value $b_{F1}$. By means of this signal sent out at output 74, the braking pressure control valve 18 is driven into its pressure reduction position III.

The output signal from the second differentiation stage 71 and proportional to the rear wheel deceleration $b_R$ is supplied to a comparator stage 76 similar to the comparator stage 72, which comparator stage 76 emits, at a first output 77, a signal suitable for driving the braking pressure control valve 19 into its shut-off position if the rear wheel deceleration $b_R$ is greater than a threshold value $b_{R1}$ and, at its second output 78, produces a control signal suitable for driving the braking pressure control valve 19 into its return position if the rear wheel deceleration $b_R$ is greater than a threshold value $b_{R2}$, which is in turn greater than the first mentioned threshold value $b_{R1}$.

By means of the functional elements of the control unit 14 explained so far, a rapidly responding anti-locking control in the sense of an individual wheel control is attained.

The output signals of the wheel rotational speed sensors 16 and 17, which are characteristic of the wheel rotational and peripheral speeds, are supplied to a further processing stage 79 which determines a reference velocity $V_r$ and emits, at a first output 81, a voltage output signal whose level is proportional to the brake slip $\lambda_F$ referred to this reference velocity $V_R$, and at a second output 82, transmits a voltage output signal whose level is proportional to the brake slip $\lambda_R$ of the rear wheel, referred to the same reference velocity $v_r$.

An appropriate processing of the wheel rotational speed sensor output signal to the stated reference velocity $v_r$ can consist in a velocity value being stored at the beginning of a braking procedure, which velocity value corresponds to one of the two wheel speeds required, for example the lower. Then the reference velocity $v_r$ value basic to the production of the output signals proportional to $\lambda_F$ and $\lambda_R$ is obtained by successive reduction of the stored initial reference value, the time dependence of this reference velocity reduction corresponding, for example, to that arising if braking takes place with the maximum exertable braking force at high adhesion coefficients ($\mu \approx 1$) between the track and the vehicle wheels. It is, however, obvious that the time dependence of the reduction of the reference velocity can also be modified as a function of the $\lambda_F$ and $\lambda_R$ values determined from this to produce a slower reduction.

These output signals proportional to the brake slip $\lambda_F$ and $\lambda_R$ from the processing stage 79 are supplied to a third comparator stage 83, in which these signals proportional to the brake slip are now compared with one another. This comparator stage 83 emits an output signal at a first output 84 if the front wheel brake slip $\lambda_F$ reaches or exceeds a value which is less than the brake slip $\lambda_R$ at the rear wheel by the amount $D_1$. By means of the output signal emitted at output 84, the braking pressure control valve 18 allocated to the front wheel braking circuit is driven into its pressure maintaining position II via 84'. The third comparator stage 83 emits an output signal at a second output 86 if the brake slip $\lambda_F$ of the front wheel still differs from the brake slip $\lambda_R$ of the rear wheel only by the amount $d=(D_1-D_2)$, which is smaller than $D_1$. The braking pressure control valve is driven into its pressure reduction position III via 86' by the output signal of the third comparator stage 83 emitted at the second output 86. The third comparator stage 83 produces an output signal at a third output 88 if the absolute brake slip $\lambda_F$ of the front wheel reaches or exceeds a first threshold value $\lambda_{F1}$.

The braking pressure control valve 18 is also driven into its pressure maintaining position II by the latter output signal, which is proportional to a time integral $\int b \cdot dt = L$ ($L=$ upper limit of the front wheel slip, at which the anti-locking system is intended to respond) of the wheel deceleration.

If, none the less, the brake slip 80 $_F$ increases further, the comparator stage 83 produces an output signal at a fourth output 89, by means of which output signal the braking pressure control valve 18 is driven into its pressure reduction position III.

It will be understood by those skilled in the art that signals representing predetermined data values for $D_1$, $D_2$, $d_1$ and $\lambda_1$ and $\lambda_2$ may be introduced to the third comparator 83 from external sources or, alternatively, may be individually stored within third comparator 83, for use in the comparison operations which produce inputs on 84, 86, 88 and 89.

An electrical signal suitable for appropriate driving of the drive motor 68 of the return pump 59 is obtained from an OR connection 87 of all the output signals of the comparator stages 72, 76 and 83.

This design of the control unit 14 has the effect that the anti-locking system 10 also responds when, during careful braking, because the rider recognizes a dangerous situation the deceleration limiting values $b_{F1}$ and $b_{R1}$ are not exceeded but, nevertheless, the vehicle wheels attain even higher slips $\lambda_F$ and 80 $_R$ and the brake slip 80 $_F$ of the front wheel always remains less than the brake slip $\lambda_R$ occurring at the rear wheel and, therefore, even in critical braking situations, guarantees good controllability of a motorcycle equipped with the anti-locking system 10 according to the invention.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. An anti-locking system for a two-wheel road vehicle having a hydraulic dual circuit braking installation, a front wheel brake and a rear wheel brake, with a wheel rotational speed sensor means provided individually for the front and rear vehicle wheels, means for generating deceleration signals respectively therefor and with braking pressure control means, the braking pressure control means having braking pressure control valves for controlling the front wheel brake and rear wheel brake, the braking pressure control valves having at least a pressure maintaining position and a pressure reduction position, first comparator means receiving said front wheel deceleration signal $b_F$ and comprising first means transmitting a signal when front wheel deceleration $b_F$ exceeds a threshold value $b_{F1}$ for driving the pressure control valve means into the pressure maintaining position and second means transmitting a signal when front wheel deceleration $b_F$ exceeds a second threshold value $b_{F2}$ which is greater than the threshold value $b_{F1}$ for driving the pressure control valve means into the pressure reduction position, second comparator means receiving said rear wheel deceleration signal $b_R$ and comprising third means transmitting a signal when rear wheel deceleration $b_R$ is greater than a threshold value $b_{R1}$ for driving the pressure control valve means into the pressure maintenance position, and fourth means transmitting a signal when rear wheel deceleration $b_R$ is greater than a second threshold value $b_{R2}$ which is greater than threshold value $b_{R1}$ for driving the pressure control valve means into the pressure reduction position, a processing means receiving front wheel rotation speed signals and rear wheel rotation speed signals for generating a front brake slip signal $\lambda_F$ and a rear wheel brake slip signal $\lambda_R$, said signals $\lambda_F$ and $\lambda_R$ being referenced to a reference velocity $v_r$, third comparator means receiving said front and rear brake slip signals $\lambda_F$ and $\lambda_R$ and comprising fifth means transmitting a signal when front brake slip $\lambda_F$ is greater than or equal to a value which is less than the rear wheel brake slip $\lambda_R$ by an amount $D_1$ for driving the pressure control valve means into the pressure maintaining position, sixth means generating a signal when front wheel brake slip $\lambda_F$ differs from the rear wheel brake slip $\lambda_R$ only by an amount $d$ which is smaller than $D_1$ for driving the braking pressure control valves into the pressure reduction position, seventh means transmitting a signal when front wheel braking slip $\lambda_F$ equals or exceeds a first threshold value $\lambda_{F1}$ for driving the braking pressure control valves into the pressure maintaining position, and eigth means transmitting a signal when front wheel brake slip $\lambda_F$ is greater than a second threshold value $\lambda_{F2}$ which is greater than the threshold value $\lambda_{F1}$ for driving the pressure control valve means into the pressure reduction position.

2. An anti-locking system according to claim 1, wherein for said fifth means, said amount $D_1$ by which the brake slip $\lambda_F$ of the front wheel is to be less than $\lambda_R$ of the rear wheel is at least 3% and preferably 5%+1% of the brake slip $\lambda_R$.

3. An anti-locking system according to claim 1, wherein
a prescribed limiting value L of the brake slip $\lambda_F$ at which said braking pressure control means responds corresponds to a value at which the maximum force transmission between road and wheel exits at a maximum of a $\mu$-slip curve.

4. An anti-locking system according to claim 1, wherein
the braking pressure control means further effects on installed braking force distribution of the braking installation at braking values which are larger than a prescribed limiting deceleration which is less than a maximum decleration obtainable with high adhesion coefficients between the road and the vehicle wheels, and usable braking force at the rear wheel is greater than usable braking force at the front wheel.

5. An anti-locking system according to claim 4, wherein the prescribed limiting deceleration corresponds to a braking effort which is attainable at adhesion coefficients of $0.3+0.05$.

6. An anti-locking system according to claim 1 wherein said braking installation comprises a brake pedal and a hand lever and as part of the braking installation, the system further comprises
a tandem main cylinder with a first output pressure space allocated to a front wheel brake circuit snd a second output pressure space allocated to a rear wheel brake circuit, and a main piston of the tandem main cylinder is displaceable both by the actuation of said pedal and by the actuation of said hand lever, in the direction of a pressure increase of the two brake circuits respectively.

7. An anti-locking system according to claim 6, further comprising
a floating secondary piston within the tandem main cylinder,
said second output pressure space being limited in the axial direction by the main piston and said floating secondary piston of the tandem main cylinder being allocated to the rear wheel brake circuit and
said first output pressure space being limited by the floating secondary piston and an end wall of a housing of said tandem main cylinder allocated to the front wheel brake circuit.

8. An anti-locking system according to claim 6, wherein
the main piston of the tandem main cylinder is itself designed as a floating piston means,
a pressure rod supported on the floating piston means the rod displaceable by means of the brake pedal, and the floating piston means limits, on one side, a control pressure space of the tandem main cylinder which can be subjected to the output pressure of a control cylinder actuatable by the hand lever.

9. An anti-locking system according to claim 6, wherein
a basic position of the braking pressure control valves is a pressure-increasing position, and
wherein the rotational sensors each comprise electronic means for sensing peripheral velocity of a wheel, the anti-locking system further comprising
a front wheel brake cylinder for said front wheel brake,
a rear wheel brake cylinder for said rear wheel brake, and
means for transmitting brake fluid from said front wheel brake cylinder and said rear wheel brake cylinder into said tandem main cylinder when said braking pressure control valves are in said pressure reduction position.

* * * * *